US007831350B2

(12) United States Patent
Goudy

(10) Patent No.: US 7,831,350 B2
(45) Date of Patent: Nov. 9, 2010

(54) VEHICLE INFORMATION/TASK MANAGER

(75) Inventor: Roy Wesley Goudy, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/361,591

(22) Filed: Feb. 24, 2006

(65) Prior Publication Data
US 2006/0142917 A1  Jun. 29, 2006

Related U.S. Application Data

(62) Division of application No. 10/638,798, filed on Aug. 11, 2003, now abandoned.

(51) Int. Cl.
*G06F 19/00* (2006.01)
(52) U.S. Cl. .............................. 701/36; 701/29; 701/35; 180/277; 180/274; 340/466; 340/471
(58) Field of Classification Search ................ 701/1, 701/29, 30, 31, 34, 35, 36, 45, 33; 340/439, 340/576, 575, 466, 471; 180/272, 274, 277
See application file for complete search history.

(56) References Cited

U.S. PATENT DOCUMENTS

| | | | | |
|---|---|---|---|---|
| 6,580,973 B2 * | 6/2003 | Leivian et al. | ................. | 701/1 |
| 6,813,562 B2 * | 11/2004 | Altan et al. | ................. | 701/301 |
| 6,862,537 B2 * | 3/2005 | Skrbina et al. | ................. | 702/32 |
| 6,978,199 B2 * | 12/2005 | Markow | ....................... | 701/36 |
| 7,039,551 B2 * | 5/2006 | Shu et al. | ..................... | 702/182 |
| 7,072,753 B2 * | 7/2006 | Eberle et al. | ................... | 701/45 |
| 2002/0120371 A1 * | 8/2002 | Leivian et al. | ................. | 701/1 |
| 2003/0191568 A1 | 10/2003 | Breed | ........................... | 701/36 |
| 2003/0227395 A1 | 12/2003 | Zeineh | ....................... | 340/988 |

FOREIGN PATENT DOCUMENTS

| JP | 10-304464 | 11/1998 |
|---|---|---|
| JP | 2000-198370 | 7/2000 |

* cited by examiner

*Primary Examiner*—Ronnie Mancho
(74) *Attorney, Agent, or Firm*—Gifford, Krass, Sprinkle, Anderson & Citkowski, P.C.

(57) ABSTRACT

The present invention is operative to disable at least one infotainment device under certain conditions relative to the current driving environment of the user. The system uses a weighted matrix to assign risk to certain sensed conditions while driving. A changed condition is assigned a weight and the weighted risks are summed to calculate risk level information. The risk level information is thereafter compared to priority level information associated with at least one infotainment device. When the risk level information exceeds or is equal to the priority level information of the at least one infotainment device the system temporarily disables the infotainment device until the driving environment changes to a condition where it is safe to operate the infotainment device.

8 Claims, 2 Drawing Sheets

SYSTEM BLOCK DIAGRAM

VEHICLE INFORMATION/TASK MANAGER

RELATED APPLICATION

This application is a divisional application of U.S. patent application Ser. No. 10/638,798 filed Aug. 11, 2003, now abandoned which is incorporated herein by reference.

FIELD OF THE INVENTION

The present invention relates to vehicle safety and management of vehicle infotainment systems. More particularly, the invention relates to a vehicle information and task manager that reduces the probability of vehicle crashes due to distractions caused by the driver operating communication/multimedia devices while driving.

BACKGROUND OF THE INVENTION

To drive safely, a driver needs to give priority attention to the driving task. Even a momentary distraction can lead to a crash. The distraction can be caused by anything that draws the driver's attention away from the road.

Most people are limited in the amount of information that they can process during any given period of time. To cope with the multiple demands that occur during driving, drivers have to shift their attention back and forth to attend to each of them. Most of the time, drivers are able to do this quite well, but, if a distraction occurs at an inappropriate time or if it is prolonged, attention to driving is reduced and safety can be jeopardized.

There have always been distractions while driving; tuning a radio, eating, or attending to a child, and most recently, and most commonly, talking on a cellular or mobile phone. Additionally, a new set of distractions are associated with the ever-growing array of new in vehicle electronic devices, sometimes referred to as infotainment systems. These types of devices are rapidly being developed by the electronics and automobile industries.

Many of these new devices provide safety benefits and, in some cases, have been attributed to saving lives. However, lawmakers have been weighing the benefits of this new technology of infotainment devices in cars against the growing evidence of their potential to increase driver distraction and the risk to driver's safety.

In light of the above circumstances, the present invention seeks to provide an apparatus that reduces the probability of vehicle crashes due to distraction caused by the driver operating infotainment devices while driving.

SUMMARY OF THE INVENTION

The present invention provides an infotainment device disabling system and method which is activated when the driver's work load is large in relation to the external driving environment and the drivers use of at least one of the infotainment devices disposed in the vehicle.

The apparatus comprises an electronic device having memory wherein the electronic device is operative to receive information from at least one information source disposed on the vehicle and output risk level information relative to the present driving environment.

An information interface is in data communication with the electronic device and at least one infotainment device disposed in a vehicle wherein the information interface is operative to receive the risk the level information from the electronic device and transmit the information to the at least one infotainment device disposed in the vehicle.

A computer program is disposed within the electronic device and operates to calculate the risk level information based on the information received from the at least one information source. It is appreciated that the at least one information source provides information to the electronic device that is relative to driver's external driving environment in addition to other information, such as, vehicle dynamics relative to speed, vehicle location and information learned from previous experience by the system while the vehicle is being driven.

The apparatus is operative to compare the risk level information calculated with priority level information associated with the at least one infotainment device and thereafter generates a signal that causes the at least one infotainment device to be disabled when the risk level information calculated by the electronic device exceeds the priority level information of the at least one infotainment device. Likewise, the apparatus is operative to re-enable the at least one infotainment device when the risk level information returns to a value less than the priority level information associated with the infotainment device.

A user interface is in communication with the electronic device that is operative to allow the user to input user-defined priority information relative to at least one function of the at least one infotainment device. In this manner, the at least one function designated by the user will not be disabled by the apparatus when the risk level information exceeds the priority level information associated with the infotainment device.

BRIEF DESCRIPTION OF THE DRAWINGS

A better understanding of the present invention will be added upon reference to the following detailed description. When read in conjunction with the accompanying drawings in which like parts are given like reference numerals and wherein.

DETAILED DESCRIPTION OF THE INVENTION

By implementing the present invention in vehicles, it may be possible to avoid restrictive regulations covering the use of some types of infotainment devices upon driving in vehicles. This is because the system can judge such situations when devices could be used and when drivers need to maintain their undivided attention to the road, and for this reason, the system will temporarily disable use of the some devices.

The proposed system focuses on the external driving environment to determine the level of risk that the driving environment poses to the driver in the event the driver does not have their full attention directed toward the road.

Figure 1:
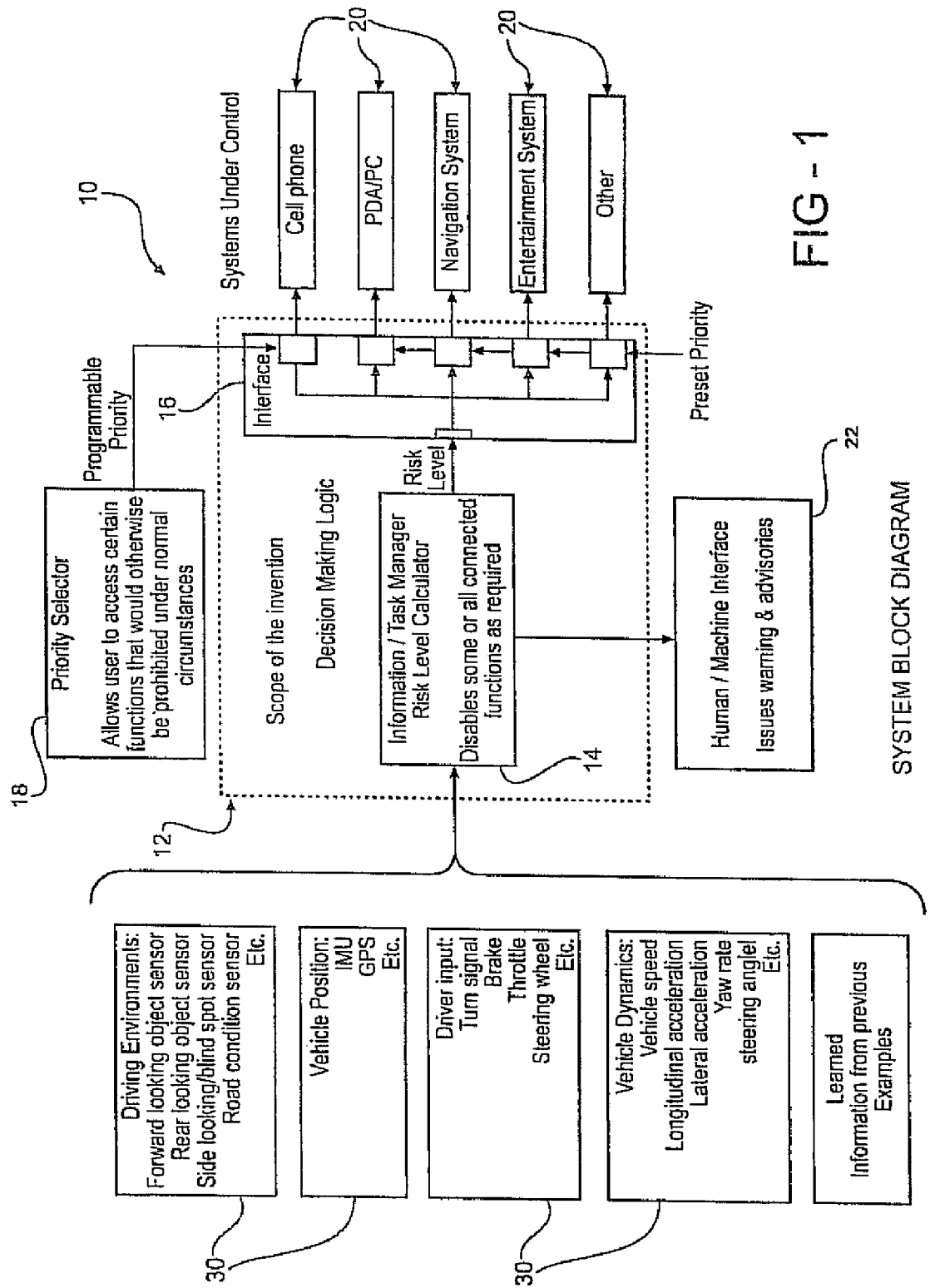
FIG. 1 is a system block diagram of the information task manager as according to the invention.

With reference to FIG. 1, the apparatus provides an information task manager system 12 operative to disable at least one infotainment device under certain driving conditions. The system 12 uses a weighting matrix to assign a risk level to certain sensed conditions such as the external driving environment, vehicle position, driver actions and vehicle dynamics. Each changed condition is assigned a weight and each of the weighted risks is summed together to comprise risk level information.

The risk level information is thereafter compared against a priority level information associated with the at least one infotainment device and a disable signal is generated to disable those infotainment devices that have priority level information that is less than or equal to the risk level information calculated by the system 12.

Under certain conditions, the user is allowed to define a priority level for at least one function associated with at least one infotainment device such that the at least one function defined will not be disabled by the system 12 as it normally would be under the circumstances when the priority level information associated with a particular infotainment device is less than or equal to the current risk level information.

With reference to FIG. 1, the system 12 includes an electronic device 14 or information task manager that is operative to receive information from at least one information source 30 and calculate risk level information relative to the information received from the at least one information source 30.

The system 12 includes an information interface 16 in data communication with information task manager 14 and at least infotainment device 20. The information interface 16 is operative to receive information from the at least one information source 30 and transmit risk level information or risk level value to the at least one infotainment device 20. The information interface 16 may be in the form of a data router having memory and data processing capability.

Preferably, priority level information or priority level value relative to at least one infotainment device 20 is disposed in the memory of the information interface 16. The priority level value information is indicative of the level of importance of sustaining the activation of the at least one infotainment device 20 during high-risk level situations. Illustratively, a navigation system may have a priority of one, an audio system component such as a radio may have a priority level of three, and a cell phone may have a priority level of five. In this fashion, risk level value information equivalent to a value of four would disable both the audio system component and the navigation system while the cell phone will remain active.

It is appreciated that the above example is merely illustrative of an assignment of priority level value information to the above-described infotainment devices and that the priority levels and devices may vary from the values and components described. The priority level information may be pre-set at pre-defined levels or may be selectively changed as desired by a system user.

The processing capability of the information interface 16 is preferably operative to receive risk level information from the electronic device 14 or information task manager and compare the risk level information to priority level value information associated with at least one of the infotainment devices 20. When the information interface 16 receives risk level value information from the information task manager 14 that is higher than the priority level value information relative to the at least one infotainment device 20, the at least one infotainment device 20 will be disabled by the system 12. Thereafter, when the information task manager 14 transmits risk level value information to the information interface 16 that is less than the priority level value information of the at least one infotainment device 20, the infotainment device will be re-enabled to normal operation.

A computer program is disposed within the information task manager 14 and is operative to calculate the risk level value information based on the information received from the at least one information source 30 and information disposed in memory of the information task manager 14.

The at least one information source may be a sensing device that senses the driving environment. Illustratively, the sensing devices may include forward, rear, side or blind spot looking optic sensors, road condition sensors, proximity detection sensors, external temperature sensors and rain detection sensors. Other information sources may include GPS, vehicle electronic systems, such as ABS, engine controller, throttle position sensor, steering position sensor, vehicle speed sensor, longitudinal acceleration, steering angle, yaw rate or the like.

Most importantly, the information task manager 14 preferably utilizes learned information derived from previous experiences relative to the driving environment. The system 12 can compare previous experiences with a current situation to modify the system response to a given set of inputs from the at least one information sources 30.

The present invention utilizes the at least one information source 30 to accomplish a form of artificial learning. The at least one information source 30 constantly provides the information task manager 14 with information concerning the external driving environment surrounding the vehicle. The system 12 uses the information from the at least one information source 30 to assess the driving environment and select the best course of action based on current conditions and previously learned behavior. In this manner, the computer is constantly updated or learns from previous experiences, and as such, the information task manager 14 provides the basis for an efficient and flexible system and method of decision-making compared to more traditional methods that utilize look-up tables.

With look-up tables, a traditional system conducts a search until it finds results that best fit current circumstances in the driving environment. The look-up table is predefined and updating the table requires a software change, and as such, the decision-making process of conventional systems does not change until the system has been reprogrammed.

With artificial learning, the system 12 of the present invention can essentially make decisions on its own as to the best course of action to take in terms of disabling the at least one infotainment device 30 under various circumstances encountered in the ever-changing driving environment.

Referring again to FIG. 1, a user interface 22 is provided in communication with the system 12 and is operative to allow the user to input user defined priority information relative to at least one function of the least one infotainment device 20. In this manner, the user is allowed to access certain functions that will otherwise be inhibited under normal circumstances.

Illustratively, for some devices such as cell phones, the user interface allows the user to define at least one incoming call phone number as critical and not to be disabled by the system 12. Accordingly, when a call comes from one of the user-defined critical numbers, the system 12 allows the call to come through despite the current circumstances of the driving environment. For all other numbers, the system 12 disables the cell phone. Conversely, the user-defined priority information may include outgoing phone numbers such as 911 or other emergency contact phone numbers.

The system 12 is also programmable to recognize a driver's use of at least one of the infotainment devices 20 such that when a high-risk condition exists, the system 12 will prompt the driver to complete his or her usage of the least one infotainment device 20 as soon as possible, but will not disable the device until the current use is completed. As an example, when a driver is on a call in progress and the state of the driving environment changes to a high-risk state, the system 12 will prompt the driver to complete the call as soon as possible but will not disable the cell phone until the call is completed.

The information task manager 14 calculates risk level information by first combining data relative to information received from the least one information source 30 with a weighted value or grade. Thereafter, all of the weighted data is combined to define the risk level information associated with the condition of the driving environment at the particular instant in time. This risk level information is thereafter used by the system 12 to disable the at least one infotainment device 20 that has an assigned priority level information that is lower than the calculated risk level information. The information task manager 14 does this by sending the risk level information to the information interface 16. The information interface 16 output a trigger signal to each infotainment device 20 such that any infotainment device 20 having priority level information that is less than or equal to the risk level information will be disabled.

Figure 2:
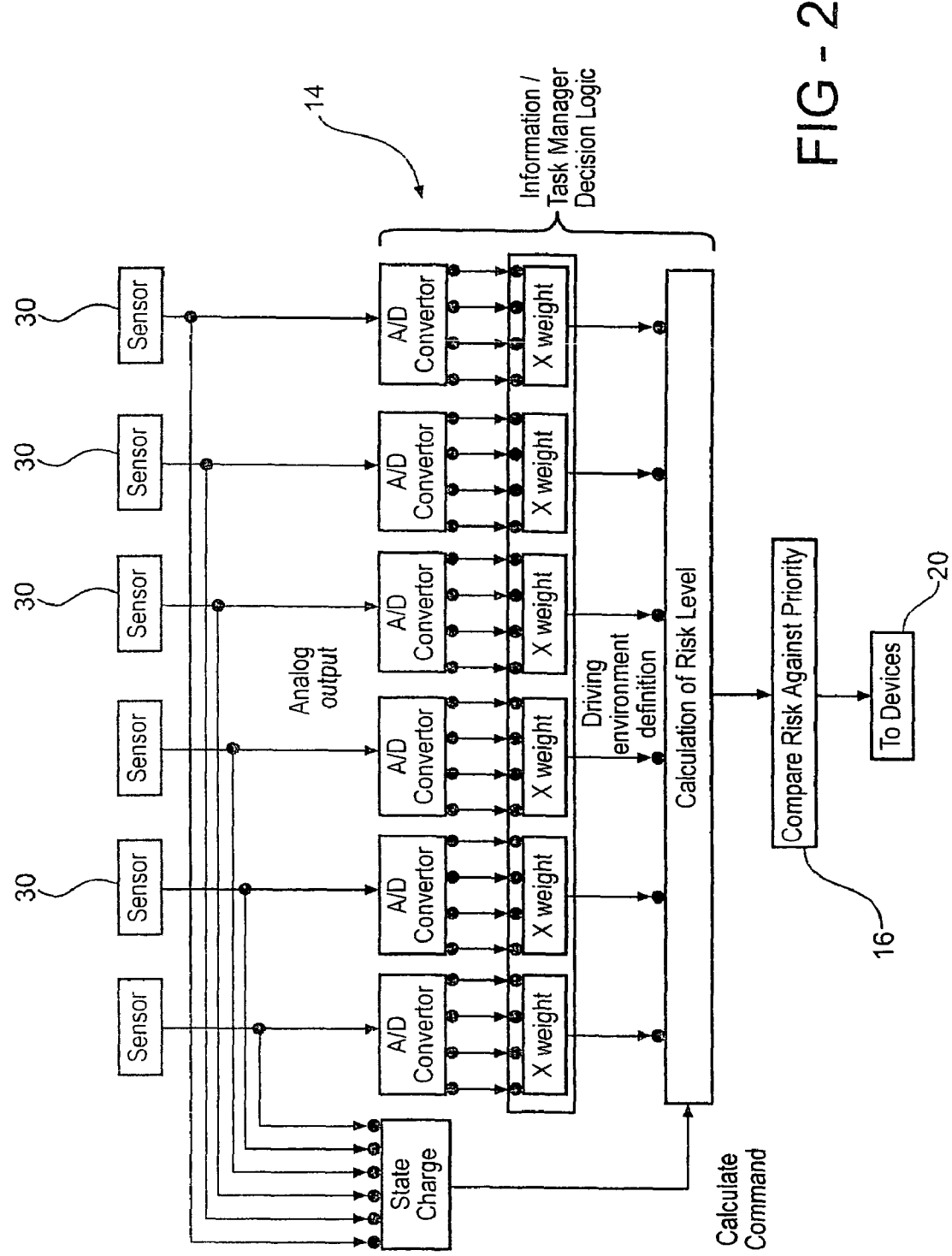
FIG. 2 is a schematic block diagram of the information task manager and communication with information sources and infotainment devices as accorded to the invention.

With reference to FIG. 2, a schematic illustration of the inventive apparatus 10 as provided. It is appreciated that the system 12 may be a single unit that comprises both the information task manger 14 and the information interface 16 in a single unit. Alternatively, the information task manager 14 and information interface 16 may be provided as separate units as best illustrated in FIG. 2.

FIG. 2 is exemplary of the components and process whereby the unique apparatus 10 is provided for reducing the probability of vehicle crashes due to distractions caused by the driver operating infotainment devices while driving. However, it is appreciated that other component architectures and processes may become apparent to those skilled in the art without exceeding the scope of the present invention.

Referring again to FIG. 1, the apparatus 10 preferably includes a user interface 22 that is operative to provide the user a visual indicator to notify the user that a device has been temporarily disabled due to the present driving conditions or that the use of such device should be discontinued as soon as possible. Other indicators may be incorporated into the user interface such as audible alarms, tactile indicators, verbal indicators or other types of indicators suitable for such purpose.

Preferably, the information interface 16 includes at least one timing device wherein the at least one infotainment device 20 that has been disabled will only be re-enabled after the expiration of a predetermined time period following the trigger signal that is generated when the risk level information returns to a value less than the priority level information associated with the particular infotainment device 20.

As illustrated in FIG. 2 the risk level information is calculated by the information task manager 14, and the priority level information is calculated by the information interface 16. However, is it appreciated that these tasks may be allocated to either one or both of the information task manager 14 and information interface 16 without exceeding the scope of the invention. It is also appreciated that these tasks may be allocated to some other device having the capability to perform such function.

A method for facilitating a safe operation of a vehicle in relation to a driver's use of at least one infotainment device 20 disposed in a vehicle as according to an invention may be described as a process comprising the steps of providing an electronic device having memory in communication with at least one infotainment device 20 whereas the electronic device is operative to disable some or all of the functions of the least one infotainment device.

The process continues by providing information relative to the external driving environment of the vehicle to the electronic device for calculating risk level information as described above. Wherein the risk level information is preferably calculated using the information received relative to the external driving environment and the information learned from previous experience.

Thereafter, the process continues by comparing the risk level information with priority level information associated with the least one infotainment device 20, such that, the infotainment device 20 is disabled when the priority level information is less than or equal to the calculated risk level information.

Finally, the process ends with the system re-enabling the at least one infotainment device 20 when the priority level information of the infotainment device is higher than the present risk level information. The foregoing figures and descriptions thereof are provided as illustrative of a preferred embodiment of this invention and are not intended to be all-inclusive. It is understood that various changes to essential components and additions to the system and/or method may be resorted to without departing from the spirit of the invention or scope of the claims as presented.

The invention claimed is:

1. A method of information task management for a vehicle having an infotainment device, said method including the steps of:
sensing a plurality of predetermined external operating conditions of the vehicle using a plurality of sensors disposed on the vehicle;
storing a plurality of quantitative risk level values for each said predetermined external operating condition in an information task manager;
storing information related to external operating conditions in the information task manager;
updating the plurality of risk level values based on the information related to external operating conditions;
summing the risk level value for each of the plurality of predetermined external operating conditions to produce a sum of risk level values;
assigning a priority level value to the infotainment device on the vehicle; and
disabling the infotainment device when the summed risk level value is greater than the priority level value for the infotainment device.

2. The method as set forth in claim 1 wherein said updating step includes using artificial learning to update the risk level values.

3. A method of information task management for a vehicle having an infotainment device, said method including the steps of:
defining a predetermined priority level value for the infotainment device, wherein the predetermined priority level value determines disablement of the infotainment device;
associating a quantitative risk level value with each of a plurality of predetermined external operating conditions of the vehicle, wherein the operating condition risk level value is a weighted value, and the operating condition risk level value is stored in a memory of an information task manager;
sensing a plurality of external operating conditions of the vehicle, wherein each operating condition is sensed using an associated sensing device;
comparing each of the sensed operating conditions of the vehicle to a corresponding previously sensed external operating condition of the vehicle, to determine if any of the sensed operating conditions of the vehicle has changed by a predetermined amount;
assigning a quantitative risk level value to each changed external operating condition, wherein the actual risk level value for each changed operating condition is the operating condition risk level value associated with the respective sensed operating condition from the information task manager;

determining a summed risk level value by summing together each assigned risk level value for each changed operating condition; and comparing the summed risk level value to the predetermined priority level value for the infotainment device, and disabling the infotainment device when the summed risk level value is greater than the predetermined priority level value for the infotainment device.

4. The method as set forth in claim 3 wherein a user may define the predetermined priority level value for the infotainment device so that at least one function of the infotainment device will not be disabled.

5. The method as set forth in claim 3 wherein a user may selectively define the predetermined priority level for the infotainment device.

6. The method as set forth in claim 3 further including the step of re-enabling the disabled infotainment device when the summed risk level value is less than the predetermined priority level value for the infotainment device.

7. The method as set forth in claim 3 wherein the risk level value is updated using information learned during operation of the vehicle.

8. The method as set forth in claim 3 further including the step of providing a user with a visual indicator that the infotainment device is disabled.

* * * * *